United States Patent

[11] 3,586,772

[72] Inventor William W. Hardin
Stewartville, Minn.

[21] Appl. No. 731,889
[22] Filed May 24, 1968
[45] Patented June 22, 1971

[73] Assignee International Business Machines
Corporation
Armonk, N.Y.

[54] SECOND ORDER VIDEO CLIPPER FOR OPTICAL CHARACTER READER
5 Claims, 2 Drawing Figs.

[52] U.S. Cl. .......... 178/7.1, 346/146.3
[51] Int. Cl. .......... H04n 1/00
[50] Field of Search .......... 178/7.1, 7.2; 250/214, 219 CR; 346/146.3

[56] References Cited
UNITED STATES PATENTS

| | | | |
|---|---|---|---|
| 2,855,513 | 10/1958 | Hamburgen et al. .......... | 178/7.1 |
| 3,159,815 | 12/1964 | Groce .......... | 340/146.3 |

OTHER REFERENCES

ANALOG COMPUTATION Jackson McGraw-Hill Book Company, 1960 pp. 47.

*Primary Examiner*—Robert L. Griffin
*Assistant Examiner*—Donald E. Stout
*Attorney*—Sughrue, Rothwell, Mion, Zinn & Macpeak

ABSTRACT: An optical character reader providing output signals proportional to the lightness or blackness of the document being scanned generates a clipping level voltage which is not a fixed percentage of the peak black minus peak white signals. The clipping level percentage varies with the density, or blackness, of the character. The black and white peak signals are applied to a differentially connected operational amplifier having an output proportional to a first multiple times the black peak minus a second multiple times the white peak, where the first and second multiples are unequal. The output of the operational amplifier is added to a signal proportional to white background thereby providing a clipping level which is a variable percentage of the difference between a black and white peak signal.

PATENTED JUN 22 1971 3,586,772

INVENTOR
WILLIAM W HARDIN

BY Sughrue, Rothwell, Mion, Zinn & Macpeak
ATTORNEYS

SECOND ORDER VIDEO CLIPPER FOR OPTICAL CHARACTER READER

BACKGROUND OF THE INVENTION

In optical character recognition systems, a document is scanned and electrical signals are developed having an amplitude proportional to the blackness of the document intercepted by the scanning means. As the character density or blackness increases there is less light reflected into the photomultiplier circuit of the scanning mechanism making the output electrical signal more positive. The output electrical signals are applied to a threshold means which effectively decides whether the scanning mechanism is presently scanning a black character or a white background region. Information signals identifying the position of the scanning beam and the black character signals out of the threshold means are applied to recognition logic which operates to identify the character being scanned. In such systems, it is necessary to provide a reference level voltage, referred to as the clipping level voltage or clipping level, for comparison with the electronic signals to determine whether or not the electronic signal is to be presently identified as a black signal on a white signal. (The terms "black" and "white" as used herein refer to the character and background, respectively, and although the character is normally black and the background normally white, it is not intended that the words "black" and "white" as used herein be strictly limited to the colors black and white.)

In the prior art, the clipping level is a fixed percentage of the black peak minus white peak. That is, a system was provided for detecting the most positive amplitude, corresponding to the black peak, and the least positive amplitude, corresponding to the white peak, over a predetermined period of time and generating a clipping level in response to these two signals. In such systems, the clipping level, although varying with a change in the density or blackness of the characters, remained a fixed percentage of the black peak minus white peak. In some systems, in order to cope with specific problems, such as very dark or very light characters, various shifts or different percentages are sometimes switched into the clipping level generator. The latter scheme has been less than satisfactory for a broad range of densities of characters.

Generally, when the characters are very dense, such as those resulting from a typewriter having a new ribbon, the document will contain a lot of smudges resulting in a high level of background noise (unwanted signals). On the other hand, for a very old typewriter ribbon the document will contain low density characters and very little background noise. If a clipping level generator is set at a fixed percentage of black minus white sufficient to eliminate the high level noise in the former case, then it may be insufficient to detect the low density characters in the latter case. The reverse is also true.

SUMMARY OF THE INVENTION

In accordance with the present invention, a clipping level is generated having a clipping level percentage which is a function of the character density. That is, for very dense characters, resulting in high amplitude black level signals, the clipping level will be a relatively high percentage of the black minus white peaks, whereas for a low density character the clipping level will be a relatively low percentage of the black minus white peaks. This is accomplished by connecting the black and white peaks to a differentially connected operational amplifier having external resistors selected to provide a difference voltage proportional to the difference between a first multiple times the black peak and a second multiple times the white peak. The latter signal is added to a white background signal to provide the clipping level.

DETAILED DESCRIPTION OF THE DRAWINGS

The invention will be described in conjunction with an optical character reader which operates in the following mode: The first character detected on a line is curved followed by the optical scanner for the purpose of normalization. Only the first character is curved followed and all of the remaining characters in the line are scanned by the recognition scan. Many different types of recognition scans are well known in the art and the particular type used is not important to the present invention. During the curve follower normalization scan, the black and white peaks are detected to provide the necessary difference signal for generating the clipping level voltage. The difference signal which is generated is held during the time that the remainder of the characters in a line are scanned.

It should be noted that although the invention is described in conjunction with an optical character reader operating in accordance with the above format, the format in itself forms no part of the present invention.

Figure 1:
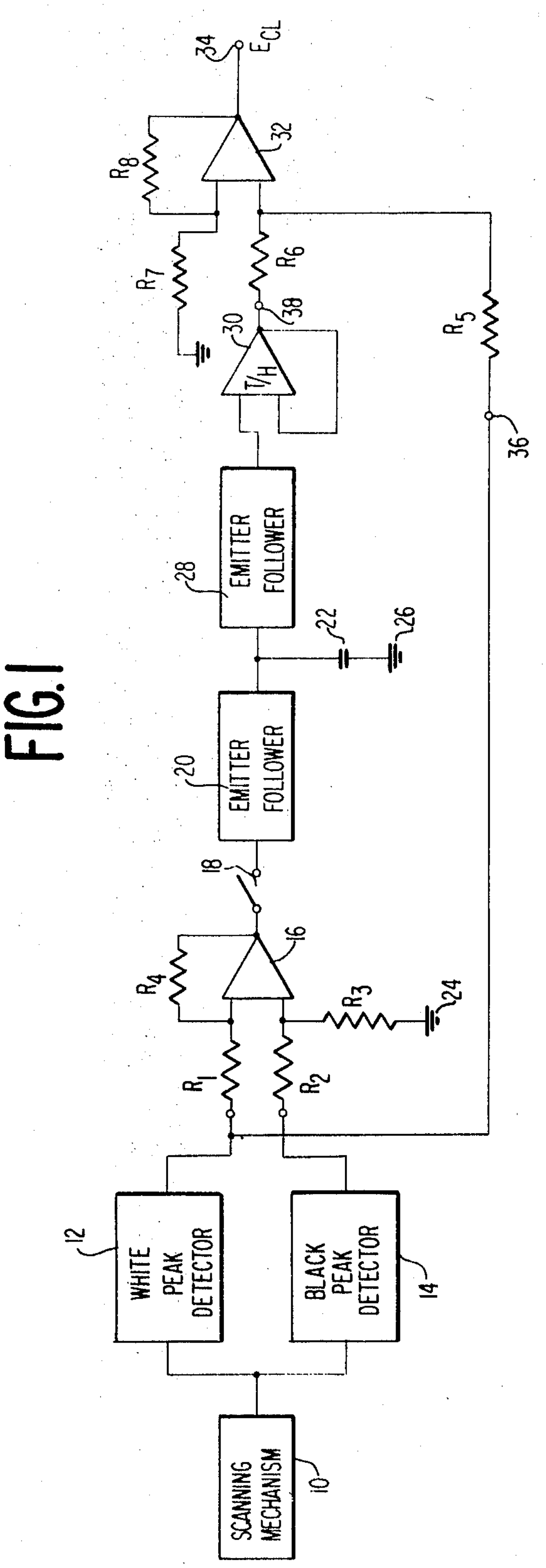
FIG. 1 is a partial block diagram and partial schematic diagram illustrating a preferred embodiment of the present invention operating in conjunction with an optical scanning mechanism.

Referring to FIG. 1, there is shown a scanning mechanism illustrated generally at 10, a white peak detector 12, a black peak detector 14, a pair of operational amplifiers 16 and 32, a pair of emitter followers 20 and 28, a capacitor 22, and a track and hold circuit 30. The output of scanning mechanism 10, which is connected to the peak detectors 12 and 14 is an electronic signal having an upper level proportional to the blackness of the characters in the document being scanned and a lower level proportional to the whiteness of the document background. In order to detect black and white peaks during the curve follower scan, it is well known in the art to use amplitude demodulators for the peak detectors. Thus, white peak detector 12 may be a conventional amplitude demodulator which detects the lower envelope of the input frequency and black peak detector 14 may be a conventional amplitude demodulator which detects the upper envelope of the input frequency.

Figure 2:
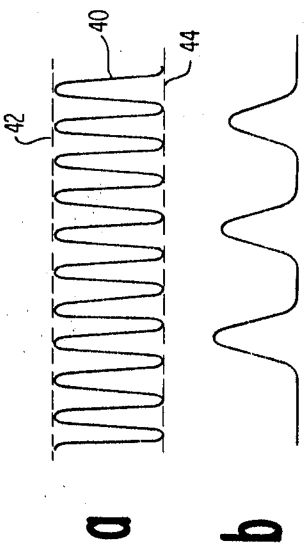
FIG. 2 illustrates examples of waveforms produced by an optical scanner mechanism.

During the curve follower scan, as is well known in the art, the output of scanning mechanism 10 will have the form of any high frequency signal, e.g., 50 kc., having an upper amplitude envelope proportional to the blackness of the character which is being scanned and a lower amplitude envelope proportional to the whiteness of the document adjacent the character being scanned. If the character is fairly uniform and there are substantially no smudges around the character, the upper and lower envelopes will not vary. A typical signal out of the scanning mechanism during a curve follower scan is illustrated in waveform (*a*) of FIG. 2, wherein the frequency of the signal 40 is dependent upon the curve follower frequency, the upper amplitude envelope, shown by dotted line 42, is proportional to the blackness of the character being scanned, and the lower amplitude envelope, illustrated by dotted line 44 is proportional to the white background of the document adjacent the character being scanned. Since peak detector 12 detects the lower envelope, a signal level which is the same as the signal level for broken line 44 will appear at the output of peak detector 12. Also, since peak detector 14 detects the upper envelope of the input signal, the output level from peak detector 14 will be the same as broken line 42 of waveform (*a*). The output levels will hereinafter be referred as the white peak and black peak, respectively. The manner just described for detecting the white and black peaks in an optical scanning mechanism is not critical to the present invention, and, in fact, any prior apparatus and method for detecting the white and black peaks will operate with the present invention, which will now be described.

The outputs from the peak detectors 12 and 14 are connected to a differential amplifier means comprising operational amplifier 16, and resistors $R_1$ thru $R_4$.

Operational amplifiers are well known in the art and the gain of the overall amplifier is determined by the external resistances connected thereto. For an operational, differentially connected amplifier, such as operational amplifier 16, having external resistors $R_1$ through $R_4$, connected as shown, the gain expression is:

$$E_0=\frac{R_3}{R_1}\frac{(R_1+R_4)}{(R_2+R_3)}\text{ Black}-\frac{R_4}{R_1}\text{ White,}$$

where Black is the signal from the peak detector 14, White is the signal from peak detector 12, both detected during the normalization scan. E is the output voltage from amplifier 16. $R_1$ and R re the input resistors. $R_3$ is the reference resistor. and $R_4$ is the feedback resistor.

It is known in the prior art to make $R_1=R_2=R$ and $R_3=R_4=R'$, thus reducing the above expression to:

$E_0$='/R (Black − White).

In order to generate the clipping level voltage, $E_{CL}$, the output $E_0$ is added to the white background level resulting in the expression:

$$E_{CL}=\frac{R'}{R}(\text{Black}-\text{White})+\text{White}'.$$

Where: White' = the White background level detected during the recognition scan.

second multiples are unequal. As can be seen, therefore, this is a nonlinear function of the difference between the black level and the white level. When an output of this nature is added to the white background voltage, the result is a clipping level voltage having a percentage of black minus white which varies nonlinearly with the density of the characters. For a specific example let the resistors $R_1$, through $R_4$ have the following values:

$R_1={}_2=4K$; $R_3=12K$ and $R_4$=2ahK

The gain expression for the amplifier thus becomes:

$E_0=B/8-W/2=\frac{1}{2}(2.25B-W)$.

In the latter expression, the first multiple is 2.25 and the second multiple is 1. The expression for $E_{CL}$ becomes:

$E_{CL}=\frac{1}{2}(2.25B-W)+W'$.

The following tables illustrate how the percentage of $(B-W)$, which is $E_{CL}$, varies for different values of the black peak level. In the tables the white peak level is assumed constant. In Table I, the white peak level is assumed to be at −4.0 volts and in Table II, the white peak level is assumed to be at −3.0 volts.

TABLE I

| | 2.25B | 2.25B−W | ½(2.25B−W) | ½(2.25B−W) +W' | Percent ECL |
|---|---|---|---|---|---|
| Black peak: | | | | | |
| −4 | −9.0 | −5 | −2.5 | −6.5 | |
| −3 | −6.75 | −2.75 | −1.4 | −5.4 | |
| −2 | −4.5 | −0.5 | −0.25 | −4.25 | |
| −1 | −2.25 | +1.75 | +0.88 | −3.12 | 30 |
| 0 | 0 | +4 | +2.0 | −2.0 | 50 |
| +1 | +2.25 | +6.25 | +3.13 | −0.87 | 62 |
| +2 | +4.5 | +8.5 | +4.25 | +0.25 | 71 |
| +3 | +6.75 | +10.75 | +5.38 | +1.38 | 77 |
| +4 | +9.0 | +13.0 | +6.5 | +2.5 | 81 |

TABLE II

[W = −3.0 volts]

| | 2.25B−W | 2.25B−W | (2.25B−W)/2 | (2.7.5B−W)/2 +W' | Percent ECL |
|---|---|---|---|---|---|
| Black peak: | | | | | |
| −3 | −6.8 | −3.8 | −1.9 | −4.9 | |
| −2 | −4.5 | −1.5 | −0.8 | −3.8 | |
| −1 | −2.3 | +0.7 | +0.4 | −2.6 | 20 |
| 0 | 0 | +3.0 | +1.5 | −1.5 | 50 |
| +1 | +2.3 | +5.3 | +2.6 | −0.4 | 65 |
| +2 | +4.5 | +7.5 | +3.8 | +0.8 | 76 |
| +3 | +6.8 | +9.8 | +4.9 | +1.9 | 82 |
| +4 | +9.0 | +12.0 | +6.0 | +3.0 | 86 |
| +5 | +11.3 | +14.3 | +7.1 | +4.1 | 88 |

Hereinafter, the letters W and B will be used in the equations to express the terms White and Black, respectively. The above expression for $E_{CL}$ results in a clipping level voltage which varies with the density of the characters but remains a function of a fixed percentage of the difference between the black and white levels. That percentage is determined by the ratio of $R'$ to $R$, and can be altered by changing this ratio. However, as pointed out above, it has been discovered that it is preferable to have a clipping level voltage which is not a fixed percentage of the difference between the black and the white levels.

In accordance with the present invention, the feedback resistance $R_4$ is made unequal to the reference resistance $R_3$ In the above tables, the column on the right labeled "$E_{CL}$" represents the percentage of the term $(B-W)$ which is equal to $E_{CL}$. Note that the percentage increases with an increase in the character density as illustrated by the increasing positive amplitude of the Black peak in the far left-hand column.

Table III below, illustrates another example in which $R_1=R_2=4K$, $R_4=2K$, $R_3=10K$ and the White peak is assumed constant at −3.5 volts. Under these circumstances, $E_0=\frac{1}{2}(2.1B-W)$.

TABLE III

| | 2.1×B | 2.1×B−W | ½(2.1B−W) | ½(2.1B−W) +W' | Percent ECL |
|---|---|---|---|---|---|
| Black peak: | | | | | |
| −3 | −6.3 | −2.8 | −1.4 | −4.9 | |
| −2 | −4.2 | −0.7 | −0.4 | −3.9 | |
| −1 | −2.1 | +1.4 | +0.7 | −2.8 | 28 |
| 0 | 0 | +3.5 | +1.8 | −1.7 | 50 |
| +1 | +2.1 | +5.6 | +2.8 | −0.7 | 62 |
| +2 | +4.2 | +7.7 | +3.8 | +0.3 | 69 |
| +3 | +6.3 | +9.8 | +4.9 | +1.4 | 75 |
| +4 | +8.4 | +11.9 | +5.9 | +2.4 | 79 |

resulting in an output $E_0$ which is proportional to the difference between a first multiple times the black level and a second multiple times the white level where the first and There may be many methods and circuits for adding the output $E_0$, hereinafter referred to as the difference output, to the white background signal, and one of these methods and circuits is illustrated in FIG. 1. It should be understood that the method of deriving the white background level and the particular circuitry used to add the difference signal to the white background signal is not critical to the present invention.

As discussed above, the invention is assumed to be operating, in FIG. 1, with an optical character recognition system that performs a curve following normalization scan on the first character of the line only, and performs a different type of recognition scan on all of the characters in the line. During the curve follower mode, switch 18 is closed, thus allowing the difference voltage from the difference amplifier means, comprising operational amplifier 16 and the resistors $R_1$ through $R_4$, to be applied through the emitter follower 20 to storage capacitor 22 which has one terminal connected to ground at 20. The difference voltage stored on capacitor 22 is applied through emitter follower 28 to track and hold circuit 30. The track and hold circuit performs the function of a long period storage capacitor. That is, the input from capacitor 22 is held at the output of track and hold circuit 30 for a long period of time, sufficient to allow the scanner to complete the recognition scan of an entire line of characters.

Track and hold circuits are known in the prior art and examples of such circuits are described in commonly assigned U.S. Pat. application Ser. No. 619,226, filed Feb. 28, 1967, for High Speed Registration Technique for Position Code Scanning, by William W. Hardin, et al.

The difference voltage, appearing in the output of track and hold circuit 30, is applied to a summation amplifier means comprising differentially connected operational amplifier 32, input resistors $R_6$ and $R_5$, reference resistor $R_7$, and feedback resistor $R_8$. Assuming that resistors $R_5$ through $R_8$ are all equal and for a specific example, assuming they are equal to $2K$, the output voltage $E_{CL}$ at terminal 34 will be equal to the sum of the voltages at terminals 38 and 36.

The voltage at terminal 36 is the white background voltage and in the specific example described herein is derived from the white peak detector 12. An example of the type of signal which appears at the output of scanning mechanism 10 during the recognition scan is illustrated by waveform (*b*) of FIG. 2. In waveform (*b*), the lower level represents the white background level and the pulses represent excursions of the scanning beam across a portion of a black character. For any given document, the white level of waveform (*a*) will be the same as the white level of waveform (*b*). Instantaneous changes in the lower level of the waveforms may result from smudges on the document. Since the white peak detector 12 is an amplitude demodulator, and further, since the excursion of the scanning beam across the black character results in a short, high frequency pulse, the output of the peak detector will be equal to the lower level of waveform (*b*).

While the invention has been particularly shown and described with reference to a preferred embodiment thereof, it will be understood by those skilled in the art that various changes in form and details may be made therein without departing from the spirit and scope of the invention.

What I claim is:

1. In an optical scanning system of the type which scans a document containing characters and develops electrical signals proportional to the degree of blackness and whiteness intercepted by the scan, a clipping-level generator comprising:
   amplifier means responsive to first and second input signals representing peak blackness and peak whiteness of said electrical signals;
   means coupled to said amplifier means for generating an output signal which is a nonlinear function of the difference between said first signal and said second signal, and
   means for adding said output signal to a signal representing the white background of said document.

2. A clipping-level generator as claimed in claim 1 wherein said amplifier means is an operational amplifier having first and second differential input terminals and an output terminal, and wherein said means for generating said output signal is coupled to at least one of said differential input terminals.

3. A clipping-level generator as claimed in claim 2 wherein said output signal is proportional in amplitude to the difference between a first multiple of said first signal and a second multiple of said second signal, said first and second multiples being unequal.

4. A clipping-level generator as claimed in claim 3 wherein said means for generating said output signal comprises:
   a feedback resistor connected between one of said differential inputs and said output terminal,
   a reference resistor connected between the other of said differential inputs and a reference potential, said reference resistor being unequal to said feedback resistor, and
   a pair of input resistors connected to said differential input terminals for connecting said first and second signals to said differential input terminals.

5. A clipping-level generator as claimed in claim 4 wherein said reference resistor is greater than said feedback resistor.